US006465100B1

(12) United States Patent
Johnson, III et al.

(10) Patent No.: US 6,465,100 B1
(45) Date of Patent: Oct. 15, 2002

(54) DENSIFICATION OF COMPOSITE PREFORMS BY LIQUID RESIN INFILTRATION ASSISTED BY RIGID-BARRIER ACTINIC GELATION

(75) Inventors: William L. Johnson, III, Bear; Victor Singer, Newark, both of DE (US); Robert L. Barbin, Lancaster, PA (US)

(73) Assignee: Alliant Techsystems Inc., Edina, MN (US)

( * ) Notice: Subject to any disclaimer, the term of this patent is extended or adjusted under 35 U.S.C. 154(b) by 0 days.

(21) Appl. No.: 08/086,641

(22) Filed: Jun. 15, 1993

(51) Int. Cl.$^7$ .................................................. B32B 9/00
(52) U.S. Cl. ....................... 428/408; 428/614; 428/113; 239/265.11
(58) Field of Search ................................ 428/408, 614, 428/113; 239/265.11

(56) References Cited

U.S. PATENT DOCUMENTS

| | | | |
|---|---|---|---|
| 3,594,455 A | 7/1971 | Polovol et al. ............... 263/52 |
| 3,991,248 A | * 11/1976 | Bauer ......................... 428/245 |
| 4,252,592 A | 2/1981 | Green ......................... 156/272 |
| 4,364,879 A | 12/1982 | Gut et al. ..................... 264/22 |
| 4,689,243 A | 8/1987 | Sasaki et al. ............... 427/54.1 |
| 4,960,240 A | * 10/1990 | Paquette et al. ............ 428/368 |
| 5,154,948 A | * 10/1992 | Patrigeon et al. ........... 427/249 |
| 5,228,175 A | * 7/1993 | Olry et al. ..................... 28/168 |
| 5,244,720 A | * 9/1993 | Leung et al. ............... 428/266 |
| 5,244,748 A | * 9/1993 | Weeks, Jr. et al. .......... 428/614 |

* cited by examiner

Primary Examiner—Peter A. Nelson

(57) ABSTRACT

A method to form a sealed, partially or fully densified fiber reinforced composite preform which comprises:

impregnating said preform with a major portion of a liquid, ceramic-forming precursor;

initiating cure of the outer surface of said precursor with radiation, such as actinic radiation;

a thereby forming a sealing barrier or skin on the surface of said preform.

In a second embodiment the preform is infiltrated with a thermoplastic as liquid, frozen, excess frozen infiltrate optionally removed from the preform surface, then the preform is coated with a liquid which is curable with radiation, cure is initiated with radiation and the preform is sealed with a barrier coat.

18 Claims, No Drawings

DENSIFICATION OF COMPOSITE PREFORMS BY LIQUID RESIN INFILTRATION ASSISTED BY RIGID-BARRIER ACTINIC GELATION

BACKGROUND OF THE INVENTION

The invention relates to composite preform densification practices that use liquid infiltration to introduce ceramic matrix precursor into the void structure of the preform and concerns a method for keeping the liquid in the void space prior to rigidization, thereby completely filling the void space.

Manufacturing methods for several useful types of fiber reinforced ceramic matrix composites start with construction of a dry yarn preform; this is followed by construction of the ceramic matrix within the void spaces among the fibers of each yarn and among the yarns of the preform. Matrix construction is commonly accomplished through one or more densification cycles comprising introduction into the void spaces of matrix precursor material in either the liquid or gas phase. For liquid densified carbon-carbon and other composites intended for use as refractory materials, the desired level of gross matrix density and continuity necessitates repetition of the densification process several times, among which are interspersed very high temperature process steps. These steps pyrolyze the matrix precursor, thereby synthesizing carbon or ceramic material as volatile constituents and decomposition products are driven off. Pyrolysis also creates additional void space within the partially constructed matrix, which is substantially filled by subsequent densification cycles.

An adequate bond between the fiber and matrix fractions, essential to proper behavior of the composite material, must be achieved during densification. Thus the viscosity of the liquid precursor of the ceramic matrix must be low enough to enable penetration of the yarn and to assure wetting of the fibers. Further, the liquid precursor must have a char yield (residual weight after pyrolysis to carbon or ceramic material) sufficient to substantially preserve the fiber to matrix bond and to minimize the number of densification cycles needed to attain the desired matrix density.

An alternative to liquid densification is chemical vapor infiltration or deposition (CVI or CVD), commonly carried out at substantially elevated temperatures when the end product is a refractory. Among the important features of the CVI/CVD process are facile skinning of the component surface, a surface-to-core gradient of decreasing density, and substantial cost of the facility needed to perform CVI. Where the end products are flat laminates, such as carbon-carbon brake shoes, the reflection of the facility cost in the unit cost of product is typically minimized by substantially filling the working volume of the facility with product. For end product with large bulk or tubular form, the facility cost is a formidable obstacle to the use of CVI/CVD densification.

The invention herein is an enhanced version of a common process for the densification of composite material involving the infiltration of a thermosetting liquid resin such as phenol formaldehyde resin (resole and novolac) at or near room temperature or a thermoplastic such as moltein pitch into porous preforms with various fiber architectures made from refractory fibers such as carbon, graphite, silicon carbide, mullite (aluminum borosilicate), glass, alumina, silica, quartz, etc. Densification in the normal way proceeds by causing the liquid to flow into the interbundle and intrabundle voids by pressurization, evacuation prior to infiltration, or both.

Resin infiltration is often followed by removal of the infiltrated preform from the resin bath, so as to eliminate or minimize the need, during and after the densification, to machine the product to final form, and so as to preserve the excess resin remaining in the bath for later reuse. Removal from the bath enables a partial loss of resin from the product, by flow out of the larger voids due to the low viscosity essential to achieving the necessary penetration. The resin is next rigidized by cure at moderately elevated temperature, and is then pyrolyzed at much higher temperature. When the resin is phenol formaldehyde, the cure reactions liberate water, resulting in additional void space within the matrix.

As alternatives to early removal from the resin bath, the resin may be advanced in cure while the preform remains in the resin bath, so that removal is delayed until a high enough viscosity is achieved to preclude run out, or until the resin is completely cured.

Thermoplastics such as pitch must be melted prior to infiltration. If the product is cooled for rigidization after infiltration, the pitch on the exterior of the preform is then removed and reused. In the subsequent pyrolysis and/or carbonization, the pitch in the product must pass again through its melting point and in so doing, melts and partially flows out of the part.

Retention of a thermoplastic such as pitch in the preform can be increased by processing the preform while inside a block of pitch held in a process container to prevent resin flow out during carbonization. Alternatively, the loss of pitch during heating at the outset of the pyrolysis step can be diminished by packing furnace black filler around the product, within a processing container. In both cases, the process wastes matrix precursor material, requires the introduction of operations to remove the excess, and produces volatiles and solid residues that demand control and disposal in an environmentally safe manner.

For further background, see U.S. Pat. No. 4,364,879 which is hereby incorporated by reference, in toto.

SUMMARY OF THE INVENTION

The densification process as described above is enhanced by use of an actinic radiation curable thermoset resin as a barrier material. The actinic radiation cured resin would replace the normal class of phenolic resin derivatives in at least one of the densification cycles. With the actinic radiation cured resin, such as a low viscosity high char yield modified epoxy novolac, a densification cycle is started conventionally by causing the resin to infiltrate the porous preform with or without either the aid of prior evacuation of atmosphere or the subsequent application of pressure during infiltration or both. An important feature of the invention is to apply the actinic radiation to the infiltrated preform during or immediately after withdrawal from the resin bath to advance the resin at the surface of the preform so that the amount of resin left in the part prior to cure can be maximized while using the minimum amount of resin, thereby improving the weight pickup per densification cycle. During the removal process, the resin bath may be shielded from the actinic radiation to minimize the incidence of actinic radiation on the surface of the resin bath. At worst, a skin would form on the resin bath after removal of the part; the skin at the top of the resin bath, readily stripped off and discarded, constitutes the only unused resin lost to further reuse.

The low viscosity high char yield modified epoxy novolac resin offers the further advantage of liberating little or no water during its cure, thus minimizing this source of matrix void space upon pyrolysis.

In the case of densification using a thermoplastic such as pitch, the infiltrated preform would first be removed from the cooled block of solidified pitch. Second, the excess pitch would be removed for reuse and finally the surface of the infiltrated preform would be coated with actinic radiation curable resin such as high char yield modified epoxy novolac, in this application, preferably formulated to have high viscosity, and would be cured to make a hard barrier that retains its rigidity through carbonization. This has been recently demonstrated.

This invention is a method to densify a refractory fiber preform which comprises impregnating the preform with a major portion of a liquid, ceramic-forming precursor with actinic radiation thereby forming a sealing barrier or skin on the surface of the preform. Preferably, the liquid precursor is a high char yield low viscosity epoxy novolac resin modified by the introduction of an additive to effect actinic curing. By actinic curing is meant curing initiated by electromagnetic radiation of all kinds as well as electron beam and other particle beam radiation. The preferred radiation is ultraviolet. Also preferably the curing is initiated immediately after the impregnation, so that when impregnation is by means of immersion in a bath, cure is initiated by actinic radiation during or soon after the withdrawal of the preform from the bath of the liquid precursor. Cure completion may be accomplished by actinic radiation or, preferably, thermally since penetration of the radiation into the inner portions of the preform could be difficult. This invention magnifies the effectiveness of the liquid impregnation method of matrix construction by enabling the filling of void spaces within the fiber preform with matrix precursor rather than merely coating their interior surfaces, thereby diminishing the number of impregnation cycles necessary to create the desired matrix gross density and continuity. This method is also the use of the preferred resins for two cases: 1) liquid infiltration with rigidization during component removal from an infiltration bath and 2) enhancement of the char yield of liquid infiltrant where the infiltrant is frozen by allowing the temperature to fall to room temperature, the excess solidified infiltrant is machined or chipped off, and the surface is coated with an actinic curable resin to provide a barrier to the flow of the infiltrant out of the component before it can be charred in place. For case 1, this method is also the use of a resin and an additive; the resin may be selected from the group consisting of epoxy-functionalized phenolic resins such as DEN 431, DEN 438 and DEN 439 manufactured by Dow Chemical U.S.A.; or EPN 1138 and EPN 1139, manufactured by Ciba-Geigy; epoxy-functionalized cresol such as Ciba-Geigy ECN 1235 with reactive diluents such as Union Carbide's Cyracure UVR-6200; and epoxy-functionalized bisphenol A resins such as Ciba-Geigy's GT 6060; the additive may be selected from the group consisting of ultraviolet curing agents such as triarylsulfonium hexafluoroantimonate (Union Carbide's Cyracure UVI-6974) and methacrylates with or without the concurrent use of aliphatic amines such as hexamethylenetetramine; aromatic amines such as benzyl dimethyl amine (Ciba-Geigy's DY 062); heterocyclic amines such as Ciba-Geigy's DY 070; amine complexes such as boron trichloride-amine complex (Ciba-Geigy's DY 9577) and amine-phenol complex (Ciba-Geigy's DY 073); anhydrides such as nadic methyl anhydride and hexahydrophthalic anhydride; or anilines such as methylene dianiline where reactive diluents such as Cyracure UVR-6200 are used as required to modify the viscosity of the formulation. The preferred combination is DEN 431 epoxy novolac resin with Cyracure UVI-6974 additive. For case 2, this method is also the use of the preferred impregnant selected from the group consisting of thermoplastics such as pitch, polycarbosilane, and polybenzimidazole and a barrier material selected from the group of actinic curable resins stated for case 1.

The irradiated resin retains its rigidity while thermally decomposing hence it can perform as a barrier through the cure rigidization occurring in case 1 and through the pyrolysis of the impregnant in case 2. When used either as an impregnant or as a coating over a thermoplastic impregnated preform, the actinic cured resin acts as a surface barrier preventing loss of liquid from the interior of the preform. The invention maximizes the amount of densification per cycle while minimizing the amount of resin used thereby minimizing environmental control and related process costs.

EXAMPLES

Case 1

A preform of charred carbon fiber-phenolic resin prepreg is impregnated by immersion for 40 minutes in a bath of liquid DEN 431 epoxy novolac resin containing Cyracure UVI-6974, a mixed triarylsulfonium hexafluoroantimonate curing agent dissolved in propylene carbonate solvent, at an 8 weight percent level. After immersion, the impregnated preform is subjected to ultraviolet (U.V.) radiation as the preform is being removed from the bath. The ultraviolet radiation source is a Dr. Höhne UVAHAND 250 lamp for emission in the 315 to 600 nanometer regime. A sealing barrier or skin of resin is formed on the surface of the preform due to actinic cure of the outer surface of the phenolic resin. The cure can be completed by heating the skinned impregnated preform for a short time or aging at room temperature for a longer time.

Case 2

A laminated preform of charred carbon fiber-phenolic resin prepreg is impregnated by immersion for 40 minutes in a bath of molten pitch (temperature near 275° C.) of sufficient volume to fill and completely immerse the preform. The immersed preform and the pitch bath are allowed to cool to room temperature where the pitch solidifies. The block of pitch and preform are removed from the immersion bath and excess pitch is machined or chipped away until the surface of the component is revealed. The surface of the component is painted with an actinic curable resin such as that named in the example of case 1. The source of ultraviolet radiation is a Dr. Höhne UVAHAND 250 lamp with spectral emission in the 315 to 600 nanometer regime. The practical matrix yield is enhanced because the painted coating acts as a barrier to liquid flow so that pitch does not flow out of the preform and is charred where the matrix needs to be.

While the invention has been described in connection with what is presently considered to be the most practical and preferred embodiments, the invention is not limited to the disclosed embodiment but, on the contrary, is intended to cover various modifications and equivalents included within the spirit and scope of the following claims.

What is claimed is:

1. A method to form a sealed, densified refractory fiber preform which comprises:

impregnating said preform with a major portion of a liquid, ceramic-forming precursor comprising a resin susceptible to radiation cure initiation;

initiating cure of the outer surface of said precursor with actinic or particle beam radiation;

thereby forming a sealing barrier or skin on the surface of said preform and preventing the flowout of uncured ceramic forming precursor prior to thermal cure and carbonization.

2. The method of claim 1, wherein said liquid precursor is a low viscosity high char yield epoxy novolac resin containing an additive to effect susceptibility to cure initiation by actinic radiation.

3. The method of claim 1, wherein said curing is initiated immediately after said impregnation.

4. The method of claim 3, wherein said impregnation is by means of immersion in a bath and said cure initiation is during withdrawal of said preform from said bath of said liquid precursor.

5. The method of claim 1 wherein said resin is selected from the group consisting of epoxy-functionalized phenolic resins, epoxy-functionalized cresol resins and epoxy-functionalized bisphenol A resins.

6. The method of claim 2 wherein said additive is selected from the group of ultraviolet curing agents consisting of aromatic amines, heterocyclic amines, amine complexes, amine-phenol complexes, anilines, hexahydrophthalic anhydride and nadic methyl anhydride, and triarylsulfonium hexafluoroantimonate combined with a methacrylate.

7. The method of claim 6 wherein the aromatic amine is benzyl dimethyl amine, the amine complex is selected from the group consisting of-boron trichloride-amine complex and amine-phenol complex, and the aniline is methylene dianiline.

8. The method of claim 6 wherein triarylsulfonium hexafluoroantimonate combined with methacrylate is used with an aliphatic amine.

9. The method of claim 8 wherein the aliphatic amine is hexamethylenetetramine.

10. A method to form a sealed densified refractory fiber preform which comprises:

impregnating said preform with a high char yield thermoplastic, ceramic-forming infiltrant at a temperature high enough so that said infiltrant is a liquid, then lowering the temperature to freeze said infiltrant in said preform, then coating said impregnated preform with a resin susceptible to actinic radiation initiated cure, then initiating curing of said coating with radiation, thereby forming a sealing barrier or rigid skin on the surface of the preform and preventing the flowout of reliquified thermoplastic prior to carbonization.

11. The method of claim 10 wherein any excess of said infiltrant is removed from the outside of said preform after said infiltrant is frozen.

12. The method of claim 11 wherein said infiltrant is selected from the group consisting of pitch, polycarbosilane and polybenzimidazole.

13. The method of claim 10 wherein said cure is initiated by particle beam radiation.

14. The method of claim 10 wherein said curing is initiated immediately after said coating.

15. A method to form a sealed densified refractory fiber preform which comprises:

impregnating said preform with a high char yield thermoplastic, ceramic-forming infiltrant at a temperature high enough so that said infiltrant is a liquid, then lowering the temperature to freeze said infiltrant in said preform, then coating the impregnated preform with a resin susceptible to radiation initiated curing, wherein said resin is a low viscosity high char yield epoxy novolac resin containing an additive to effect susceptibility of cure initiation by radiation, and wherein said cure additive is selected from the group consisting of aromatic amines, heterocyclic amines, amine complexes, amine-phenol complexes, anilines, hexahydrophthalic anhydride, nadic methyl anhydride, and triarylsulfonium hexafluoroantimonate combined with a methacrylate, initiating curing of the coating with radiation whereby a sealing barrier or rigid skin of the surface of the preformed is formed which presents flowout of reliquified thermoplastic prior to carbonization.

16. The method of claim 15 wherein triarylsulfonium hexfluoroantimonate combined with methacrylate is used with an aliphatic amine.

17. The method of claim 15 wherein the aliphatic amine is hexamethylenetetramine.

18. The method of claim 10 wherein said resin susceptible to actinic radiative cure is selected from the group consisting of epoxy-functionalized phenolic resins, epoxy-functionalized cresol and epoxy-functionalized bisphenol A resins.

* * * * *

UNITED STATES PATENT AND TRADEMARK OFFICE
CERTIFICATE OF CORRECTION

PATENT NO.   : 6,465,100 B1
DATED        : October 15, 2002
INVENTOR(S)  : William L. Johnson, III, Victor Singer and Robert L. Barbin It is certified that error appears in the above-identified patent and that said Letters Patent is hereby corrected as shown below:

<u>Column 6,</u>
Line 4, change "claim 11" to -- claim 10 --.

Signed and Sealed this

Eighteenth Day of March, 2003

JAMES E. ROGAN
*Director of the United States Patent and Trademark Office*